(12) United States Patent
Karr et al.

(10) Patent No.: US 7,769,713 B1
(45) Date of Patent: Aug. 3, 2010

(54) COORDINATED DISTRIBUTED LOGGING IN A MULTI-HOST ENVIRONMENT

(75) Inventors: Ronald S. Karr, Sunnyvale, CA (US); Oleg Kiselev, Palo Alto, CA (US); John A. Colgrove, Los Altos, CA (US)

(73) Assignee: Symantec Operating Corporation, Mountain View, CA (US)

(*) Notice: Subject to any disclaimer, the term of this patent is extended or adjusted under 35 U.S.C. 154(b) by 298 days.

(21) Appl. No.: 11/865,038

(22) Filed: Sep. 30, 2007

Related U.S. Application Data

(63) Continuation of application No. 10/610,393, filed on Jun. 30, 2003, now Pat. No. 7,330,858.

(51) Int. Cl.
*G06F 17/30* (2006.01)

(52) U.S. Cl. ...................................... 707/609

(58) Field of Classification Search .................. 707/2, 707/10, 200, 609; 711/114
See application file for complete search history.

(56) References Cited

U.S. PATENT DOCUMENTS

| | | | |
|---|---|---|---|
| 5,212,788 A * | 5/1993 | Lomet et al. ............... | 707/201 |
| 5,555,371 A | 9/1996 | Duyanovich et al. | |
| 5,878,414 A | 3/1999 | Hsiao et al. | |
| 5,966,706 A | 10/1999 | Biliris et al. | |
| 6,457,098 B1 | 9/2002 | DeKoning et al. | |
| 6,519,677 B1 | 2/2003 | Fuente | |
| 6,526,419 B1 | 2/2003 | Burton et al. | |
| 6,553,509 B1 | 4/2003 | Hanson et al. | |
| 6,567,889 B1 | 5/2003 | DeKoning et al. | |
| RE38,410 E | 1/2004 | Hersch et al. | |
| 6,681,339 B2 | 1/2004 | McKean et al. | |
| 6,763,436 B2 | 7/2004 | Gabber et al. | |
| 6,807,642 B2 | 10/2004 | Yamamoto et al. | |
| 6,851,005 B1 | 2/2005 | Gnanasivam et al. | |
| 6,871,228 B2 | 3/2005 | Shah et al. | |
| 6,877,109 B2 | 4/2005 | Delaney et al. | |

(Continued)

OTHER PUBLICATIONS

Nelson M. et al. "Caching in the Sprite Network File System" ACM Transactions on Computer Systems vol. 6 No. 1 Feb. 1998 pp. 134-154.

(Continued)

*Primary Examiner*—Etienne P LeRoux
(74) *Attorney, Agent, or Firm*—Rory D. Rankin; Meyertons Hood Kivlin Kowert & Goetzel, P.C.

(57) ABSTRACT

Various systems and methods for performing coordinated distributed write logging are provided. A method may involve one of several hosts, each of which has an associated log, requesting permission to perform a write to data in a storage volume from a coordinator. The coordinator coordinates access to the storage volume between the hosts. Prior to receipt of a response from the coordinator granting permission to perform the write to the storage volume, the host may initiate logging the write data for the write to a respective log. The host may signal completion of the write to an application that initiated the write in response to both logging the write data to the respective log and receiving the response from the coordinator. The host may perform one or more underlying block operations to update the storage volume according to the write subsequent to signaling completion of the write to the application that initiated the write.

23 Claims, 3 Drawing Sheets

U.S. PATENT DOCUMENTS

| | | |
|---|---|---|
| 6,880,062 B1 | 4/2005 | Ibrahim et al. |
| 6,895,415 B1 | 5/2005 | Rezaul Islam et al. |
| 6,925,530 B2 * | 8/2005 | Busser et al. ............... 711/114 |
| 6,928,518 B2 | 8/2005 | Talagala |
| 6,947,956 B2 | 9/2005 | Olstad et al. |
| 7,117,249 B1 | 10/2006 | Kitamura et al. |
| 7,197,571 B2 | 3/2007 | Sarkar et al. |

OTHER PUBLICATIONS

IBM Technical Disclosure Bulletin Use of Non-Volatile Semiconductor Storage for Disk Array Parity vol. 33 No. 6B Nov. 1990 p. 254.

* cited by examiner

US 7,769,713 B1

COORDINATED DISTRIBUTED LOGGING IN A MULTI-HOST ENVIRONMENT

This application is a continuation of U.S. patent application Ser. No. 10/610,393, entitled "Coordinated Distributed Logging in a Multi-Host Environment", filed Jun. 30, 2003 now U.S. Pat. No. 7,330,858.

BACKGROUND

1. Field of the Invention

This invention relates to data storage and, more particularly, to techniques for performing write logging when accessing a data volume shared between multiple hosts.

2. Description of the Related Art

Many business organizations and governmental entities rely upon applications that access large amounts of data, often exceeding a terabyte or more of data, for mission-critical applications. Many of these applications require near-continuous access to data. For example, many systems such as retail processing databases, airline reservation databases, and financial institution databases must be available to perform transaction processing 24 hours a day. Downtime associated with such systems can be disastrous.

With the growing amounts of data and shrinking acceptable downtime requirements of modern systems, organizations are sometimes forced to choose between the conflicting demands associated with modern systems. For example, secondary operations such as data backup operations, reporting and analysis, and application testing can be of significant importance. However, such secondary operations can interrupt or encumber the normal transaction processing of a host system running various applications. For example, various storage techniques such as copy-on-write snapshots, replication, and RAID (Redundant Array of Independent Disks) processing may be implemented to increase reliability and/or availability of a storage volume. However, the complex operations used to implement block storage features such as these may undesirably add to the latency of block operations to the underlying storage volume.

SUMMARY

Various systems and methods for performing coordinated distributed write logging are provided. In some embodiments, a method may involve one of several hosts, each of which has an associated log, requesting permission from a coordinator to perform a write to a storage volume. Prior to receipt of a response from the coordinator granting permission to perform the write to the storage volume, the host may initiate logging the write data to a respective log. The host may signal completion of the write to an application that initiated the write in response to both logging the write data to the respective log and receiving the response from the coordinator. The host may perform one or more underlying block operations to update the storage volume according to the write subsequent to signaling completion of the write to the application that initiated the write.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
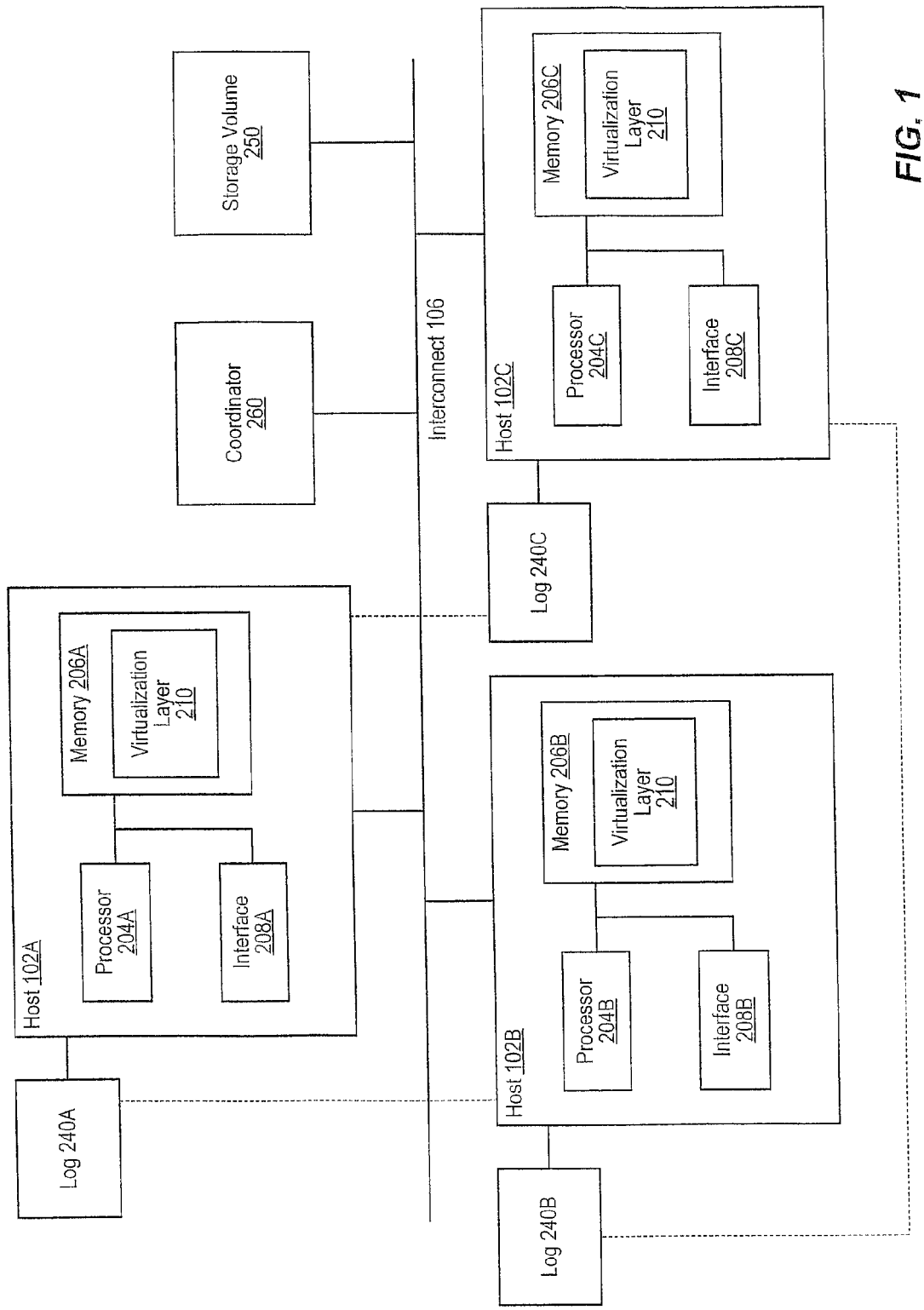
FIG. 1 is a block diagram illustrating several hosts coupled to one or more data volumes, according to one embodiment.

FIG. 1 illustrates a block diagram of a computer system that includes several hosts 102A-102C (collectively, hosts 102) coupled to a coordinator 260 and one or more storage volumes 250 by one or more communication interconnects 106. As used herein, the term "host" refers to any computing device that includes a memory and a processor configured to execute instructions stored in the memory, or to any integrated circuit (e.g., an FPGA (Field Programmable Gate Array) or ASIC (Application Specific Integrated Circuit)) configured to perform the functions specified by such instructions, or any mechanical device configured to perform such functions. Each host 102 may include various conventional software and hardware components. For example, hosts 102 may run any of a variety of operating systems such as a Unix operating system, Solaris operating system, or a Windows operating system. Hosts 102A-102C are illustrated with one or more processors 204 as well as a main memory 206 for storing instructions and/or data accessible by the processors 204. In one embodiment, main memory 206 is implemented using dynamic random access memory (DRAM), although it is noted that in other embodiments, other specific types of memory, or combinations thereof, may be utilized. Hosts 102A-102C may also each include one or more interfaces 108 for interfacing with other hosts, clients and/or storage devices (which may implement the storage volume(s) 250 and logs 240) via communication interconnect(s) 106.

FIG. 1 further illustrates various software components executable by processors 204 out of a memory medium such as main memory 206. The depicted software components include a virtualization layer 210. It is noted that these software components may be paged in and out of main memory 206 from a secondary storage medium according to conventional techniques.

The virtualization layer 210 of FIG. 1 includes functionality to virtualize the physical storage accessible by applications running on hosts 102. The virtualization layer 210 may support various specific storage management functionality, such as various levels of RAID functionality, data mirroring, and replication. In some embodiments, the virtualization layer 210 may be part of a volume manager application. As used herein, the term "volume manager" broadly refers to host software that selects and combines storage space from one or more physical storage devices into a logical volume. In one embodiment, the volume manager is a Veritas Volume Manager™ product available from Veritas Software Corporation.

In the illustrated embodiment, the hosts 102 communicate with coordinator 260 and storage volume(s) 250 via an interconnect 106. Each volume 250 may be accessed by user applications (e.g., database applications) executing on hosts 102 through the virtualization functionality provided by virtualization layer 210. It is noted that each volume 250 corresponds to a partitioning and/or aggregation of physical storage provided by one or more storage devices including, but not limited to, single storage devices (e.g., disk drives), storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. A volume 250 may be formed from a portion of the overall storage of a physical device, from the storage of an entire physical device, or from the storage of multiple physical storage devices combined.

The virtualization layer 210 may perform block operations in response to read and write requests generated by applications executing on each host 102. In particular, the virtualization layer 210 may perform the various complex underlying block operations (e.g., parity calculations and striping for RAID, writing multiple copies of data for mirroring, data movement to implement copy-on-write storage snapshots and/or replication, etc.) implemented on the storage volume(s) 250 while allowing applications to interface with the storage volume(s) 250 using basic read and write operations. In other words, the virtualization layer 210 may operate to abstract the complexities of the underlying block storage features away from the applications accessing storage volumes 250. The virtualization layer 210 may allow applications to access storage volumes 250 as an array of fixed-size readable and writeable logical blocks. As used herein, a block is a unit of storage (e.g., a 512 byte block) that may be written or read as a single I/O operation.

Each host 102 has a corresponding log 240. As used herein, a "log" is a non-volatile storage volume or portion thereof on which data can be temporarily or permanently stored prior to being written to an underlying storage volume 250. Similarly, "logging" is the act of writing data to such a log. The block operations performed by virtualization layer 210 to implement each write to the underlying storage volume 250 may require a significant amount of resources and/or time to perform. By temporarily storing data being written to the storage volume 250 in a log 240 and signaling completion of writes to initiating user applications in response to storing the write data in a log 240, the virtualization layer 210 may reduce the write latency of at least some of the writes initiated by applications executing on hosts 102 and/or improve the usage of resources needed to perform the underlying block operations. For example, in response to an application executing on host 102A initiating a write to storage volume 250, the virtualization layer 210 may store the data to be written to the storage volume in log 240A. The virtualization layer 210 may signal completion of the write to the initiating application as soon as the write data has been stored in the log 240A and a communication from the coordinator 260 is received, as will be described in more detail below. Subsequent to signaling completion of the write to the initiating application, the virtualization layer 210 may perform the underlying block operations needed to actually update the targeted region of the storage volume 250. Thus, the latency of the write, as seen by the initiating application, may be less than the time taken to actually complete all of the operations associated with the write to the storage volume 250.

Since each log 240 provides non-volatile storage, the write data is protected in case of a system failure prior to actual completion of the write to the storage volume 250. For example, if a system crash (e.g., a failure of the one of the hosts 102 performing the write) occurs after the write is signaled as complete to the initiating application but before the underlying block operations have completed to the storage volume 250, the underlying block operations may be completed by another host on crash recovery by retrieving the write data from the log 240. Accordingly, each log 240 may be accessible by at least one other host 102 to facilitate crash recovery, as shown by the dashed lines in FIG. 1. In some embodiments, each log 240 may be accessible by each host 102 (e.g., via interconnect 106).

As shown in FIG. 1, the virtualization layer 210 is distributed among several hosts 102. Each instance of the distributed virtualization layer 210 may be configured to log writes to the storage volume 250 in a log 240 that is associated with the host on which that instance is executing. For example, the virtualization layer 210 executing on host 102B is configured to log writes to host 102B's log 240B.

The virtualization layer 210 may operate to ensure that read and write semantics are preserved for all hosts 102 that access storage volume(s) 250. In general, preserving semantics involves ensuring that a read operation to a logical block returns the last value written to that block. The virtualization layer 210, in conjunction with coordinator 260, may operate to preserve write semantics by tracking the ordering of successive accesses to each block and guaranteeing that each read to a block will return the most recently written value of that block.

In order to coordinate between writes initiated on different hosts 102, each instance of the distributed virtualization layer 210 may be configured to communicate with a coordinator 260 before allowing a locally initiated write to be signaled as being completed. For example, before an instance of the virtualization layer 210 executing on host 102B can signal completion of a write initiated by an application on host 102B, that instance may request permission to perform the write from the coordinator 206 and wait until a response is received from the coordinator indicating that permission to perform the write is granted. As mentioned above, signaling completion of the write also depends on storing the write data to local log 240B. The virtualization layer 210 may begin storing the write data to log 240B before the coordinator's response is received. Since performance of the write to the log 240B is not dependent on receipt of the coordinator's response, the write may be signaled as being completed sooner than if the write data was not written to the log 240B until after receipt of the coordinator's response.

The coordinator 260 may be implemented on a single host 102 in some embodiments. For example, the coordinator 260 may be implemented in software stored in the memory 206 and executed by a processor 204 in one of the hosts 102. In other embodiments, the coordinator 260 may be distributed among hosts 102 (e.g., each host 102 may execute software implementing a distributed coordinator 260). The coordinator may be configured to perform various storage operations and/or other complex operations in additional to handling requests for access to the storage volume 250 from hosts 102. If the coordinator 260 is performing an operation when a request for access to the storage volume 250 is received from the host 102, the coordinator may be configured to complete the current operation before responding to the request. The coordinator 260 may also perform such operations in between handling requests from hosts 102 for access to storage volume 250.

Figure 2:
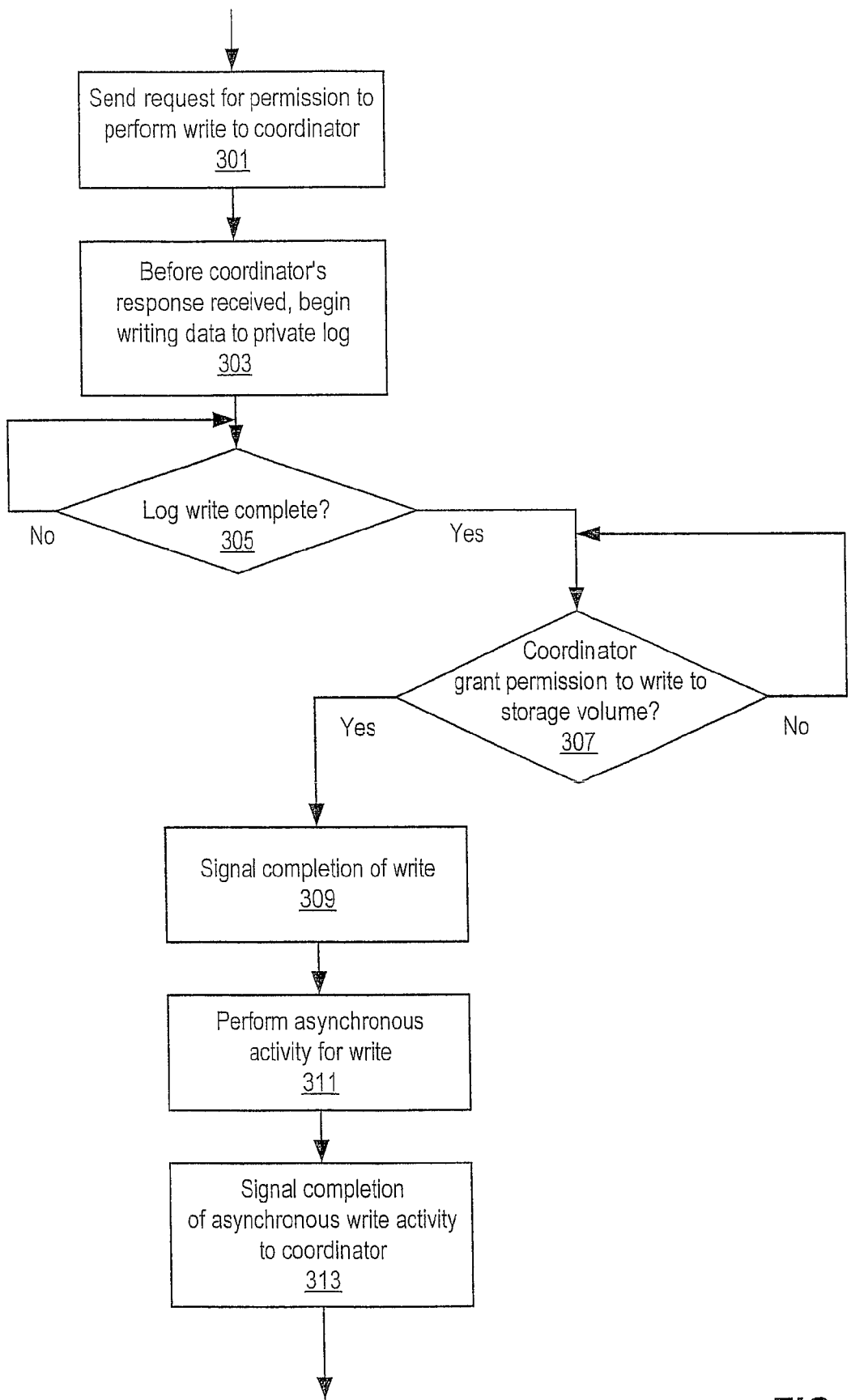
FIG. 2 is a flowchart illustrating how distributed logged writes may be coordinated between hosts, according to one embodiment.

FIG. 2 is a flowchart of one embodiment of a method of coordinating writes between different hosts. At 301, a host sends a request for permission to perform a write to one or more blocks of a storage volume to a coordinator. The coordinator receives write permission requests generated by several different hosts for blocks within the storage volume and responds to each write permission request to indicate whether write permission is granted.

As part of the write, the host begins writing the data to the host's log, as indicated at 303. The write to the log begins before a response to the request for permission to write to the storage volume, sent at 301, is received from the coordinator. In some embodiments, the host may begin the write to the host's log (at 303) before or at substantially the same time as sending the write request to the coordinator (at 301).

The host may wait until both the write to the log has completed, as determined at 305, and the coordinator grants write permission, as determined at 307, before signaling completion of the write to an initiating application, as indicated at 309. Waiting until the coordinator grants write permission to signal completion of the write has been received may guarantee that block operation semantics are preserved between the different hosts. For example, the coordinator may only allow one host at a time to have permission to write to a particular block of the storage volume, effectively serializing different hosts' accesses to the same block. Waiting until the write to the host's log has completed prior to signaling completion of the write may ensure that, if a system crash occurs subsequent to signaling completion of the write, the underlying block operations needed to write that data to the storage volume can be completed from the non-volatile log.

The host performs the block operations to write the data to the underlying storage volume, as indicated at 311, asynchronously with signaling completion of the write to the initiating application. The underlying block operations are asynchronous in the sense that the write may be signaled as being completed to the initiating application prior to the performance of the underlying block operations. Once these asynchronous block operations are complete, the host may signal completion of the asynchronous block operations to the coordinator, as shown at 313. The coordinator may then grant write permission to the same block (or blocks) to another host. The coordinator may not grant write permission to the same block to another host until the asynchronous block activity has completed, effectively preventing any other write to that block (or blocks) from being signaled as complete to an initiating application until the asynchronous block operations for the write requested at 303 have completed, as determined at 311. It is noted that functions 301-313 may be performed by a virtualization layer executing on the host performing the write.

In some embodiments, the coordinator may use exclusive locks on the blocks within the storage volume to coordinate between writes initiated on different hosts. For example, if a request for permission to write a block that is currently not locked is received by the coordinator, the coordinator may respond to the request by granting the requesting host the exclusive lock on that block. Upon completing the asynchronous block operations related to that write, the host may release the lock by communicating with the coordinator. While the host holds the exclusive lock, the coordinator may not grant any other host the exclusive lock on that block.

Referring back to FIG. 1, it is noted that the virtualization layer 210 may perform the asynchronous block operations to complete the write to the storage volume 250 by either reading the write data from memory 206 or by reading the write data from the log 240. In some situations, the write data may not be preserved in the memory 206 after the virtualization layer 210 signals completion of the write to the initiating application. In these situations, the virtualization layer may perform the asynchronous block operations by reading the write data from the log 240. These situations may arise, for example, when an application that initiated the write receives the signal that the write is complete and responsively reuses or releases the memory 206 allocated to store the write data. In some embodiments, the virtualization layer 210 may copy the write data to another location in memory 206 prior to signaling completion of the write so that a read to the log 240 is not needed when performing the asynchronous block operations to complete the write to the storage volume. The virtualization layer 210 may condition this copy operation on various criteria, such as load on the host and/or memory 206 and/or the amount of delay caused by performance of the copy. Depending on which criteria are met when a given write request is being handled, the virtualization layer 210 may selectively choose whether to copy the write data in memory 206 or to allow the write data to be discarded from the memory 206, causing the virtualization layer 210 to instead read the write data from the log 240.

By allowing the write data to be written to the log 240 before the coordinator 260 has responded to the write request, the write latency (as seen by the initiating application) may be the larger of the message round-trip time from the host 102 to the coordinator 260 and back or the time to perform the write to the log 240. Furthermore, semantics may be preserved, despite allowing the write data to be written to the log 240 prior to receiving a response from the coordinator 260, by configuring the coordinator to only allow one host to have permission to write to a given block of the storage volume 250 at any particular time and having a host performing a write not relinquish its write permission until completion of the asynchronous block operations needed to update the storage volume 250 in accordance with the write. Because the coordinator 260 only gives one host permission to write to a given block at a given time, subsequent writes to the same block may not be signaled as being completed until completion of the asynchronous block operations related to prior writes to that block.

Since the underlying block operations needed to update the storage volume 250 are performed asynchronously, the time taken to perform the underlying block operations for the write may be less critical to application performance. In some embodiments, the distributed virtualization layer 210 may take advantage of this by combining the asynchronous block operations for multiple logged writes. This may provide opportunities for more efficient access to the storage volume (s) 250 and/or allow some block operation overhead to be amortized over several writes.

In some embodiments, each instance of the virtualization layer 210 may be configured to combine several writes to a log 240. For example, in response to an application initiating a write, the virtualization layer 210 may wait for a short delay period to see if any additional writes are initiated. If so, the virtualization layer 210 may then combine the write activity to the log 240 for multiple writes initiated during that delay period.

The logs 240 may be implemented in distinct storage volumes in some embodiments. For example, each host 102 may be coupled to an independent storage volume. Alternatively, the hosts 102 may share a large volume that is divided into regions. As used herein, a region is a group of one or more blocks (e.g., a region may be a 128 Mb or 512 Mb range of the storage volume). In anticipation of demand, the coordinator 260 may assign one or more regions to a host 102 for use as that host's independent log. The virtualization layer 210 may track the amount of log 240 currently in use at each host. For example, each host 102 may monitor its log 240 and send a request for more log 240 region(s) to the coordinator 260 whenever the current usage indicates that more log 240 space may be needed. Similarly, a host 102 may notify coordinator 260 whenever a region within the log 240 is no longer needed, allowing the coordinator 260 to reassign that region to another host 102.

In some embodiments, logs 240 may provide redundant or fault-tolerant storage by providing mirroring and/or parity for the logged data. In some embodiments, logs 240 may be configured to be at least as redundant and/or fault tolerant as the underlying storage volume(s) 250. Providing redundant and/or fault tolerant logs 240 may reduce the possibility that data loss or corruption will occur between the time the write is completed to the log and the time at which the underlying block activity needed to complete the write to the underlying storage volume completes. It is also noted that in some embodiments, each log 240 may be used to log writes to multiple different storage volumes 250.

Logs 240 may implement striping or mirroring to improve log bandwidth in some embodiments. For example, if it is likely that two or more streams will write to different parts of a log 240 during overlapping periods, it may be desirable to implement striping or other techniques to enhance the bandwidth of the log. Alternatively (or additionally), logs 240 may each include non-volatile write-back cache to improve log latency.

In some embodiments, logs 240 may each be implemented as append-only logs. For example, the logs 240 may be implemented as circular queues. In alternative embodiments, logs 240 may be implemented as write-anywhere logs.

The virtualization layer 210 and coordinator 260 may also interact in order to coordinate read activity initiated on the various hosts 102. For example, if a read request is generated on one host 102A for a block that was written by another host 102B, and if that write has been logged and signaled as being completed on the other host 102B but the underlying asynchronous block operations have not yet completed to the storage volume 250, the virtualization layer 210 and coordinator 260 may operate to delay the read until the underlying asynchronous block operations have completed.

Figure 3:
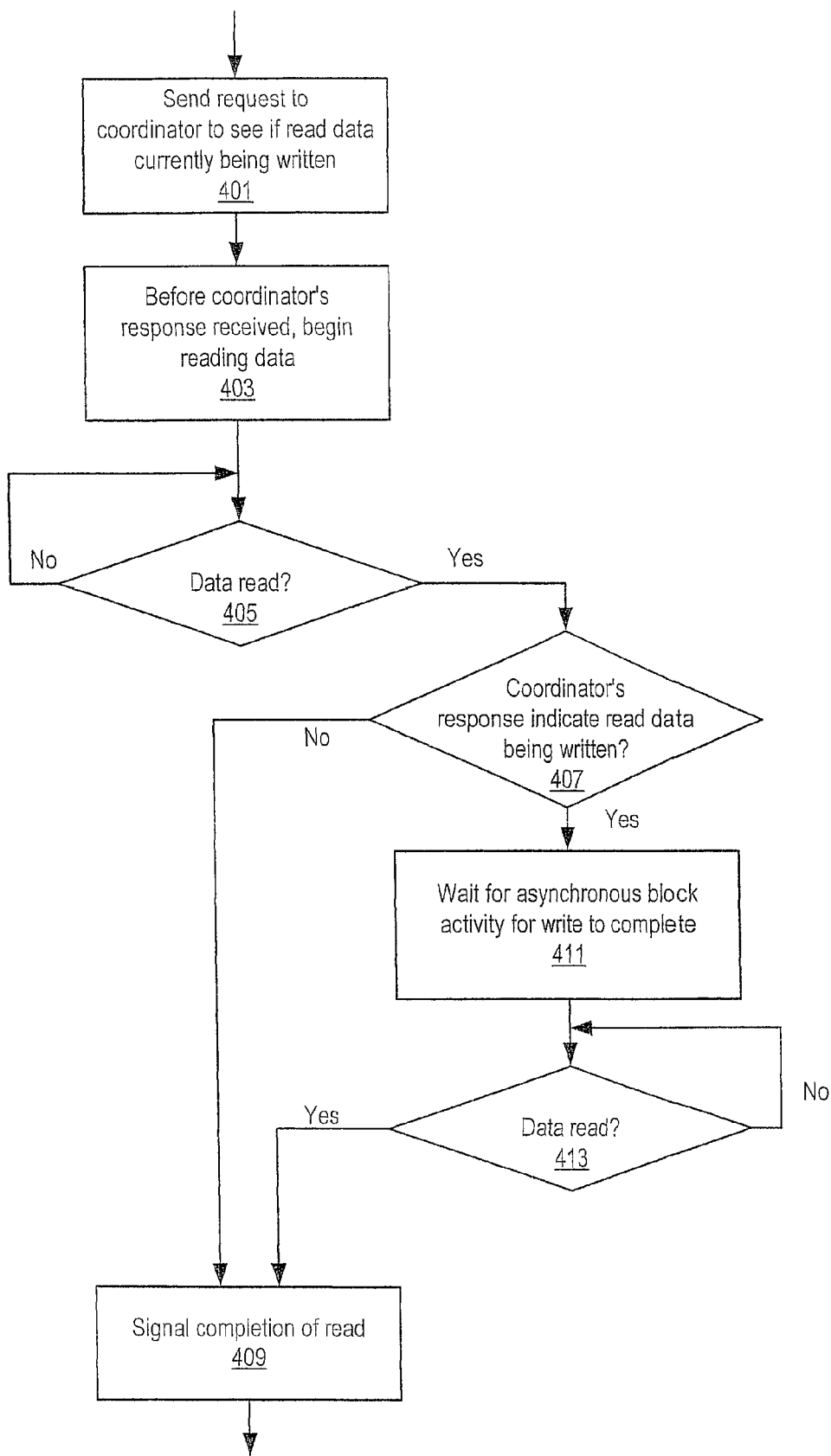
FIG. 3 is a flowchart illustrating how distributed logged writes may be coordinated with reads, according to one embodiment.

FIG. 3 is a flowchart of one embodiment of a method of coordinating read and write accesses initiated on different hosts. At 401, a host on which an application initiates a read may send a read request to a coordinator to determine if the read address is currently being written. Before the coordinator's response is received, the host may begin reading the read data from the last known location of the read data, as indicated at 403. The coordinator may respond to the read request sent at 403 based on whether the address being read is currently locked by a writer.

Once the data is read (as determined at 405) and the coordinator's response is received, the read is signaled as complete if the coordinator's response indicates that the read data is not currently being written, as shown at 407 and 409. However, if the coordinator's response indicates that the read data is currently being written, and thus that the data read at 403 may be incorrect, the host may wait for the asynchronous block activity for the write to complete, as indicated at 407 and 411, and then re-read the data at 403 in order to obtain the current value. Completion of the asynchronous block activity for the write may be indicated by the coordinator sending the host a message indicating that the read can resume. It is noted that when the host re-reads the data, the host may not send another read request to the coordinator since the host already knows that the data is not being written at 411. Accordingly, as soon as the restarted read completes, as determined at 413, the host may signal completion of the read at 409. It is also noted that functions 401-413 may be performed by a virtualization layer executing on the host.

In an alternative embodiment, if the coordinator's response indicates that the block being read is currently locked by a writer, the host performing the read may not wait for the earlier-initiated read to complete (as determined at 405) before performing another read in response to completion of the write at 411. The data returned for the earlier-initiated read may be discarded.

In other alternative embodiments, the coordinator may redirect a read to a log instead of delaying the read when the block being read is currently locked by a writer. For example, if one host initiates a read for a block being written by another host and if the other host's write has already completed to that host's log, the coordinator's response to the reading host may indicate the location of the modified block in the writing host's log. If reads are redirected to logs, the coordinator may track outstanding reads in order to determine when the data in the logs may be overwritten. For example, each time a host initiates a read from a log, the coordinator may increment a hold count associated with the region being read. As hosts complete reads to that region, the coordinator may decrement the hold count. The coordinator may only allow the region of the log to be modified when the associated hold count indicates that no outstanding reads are accessing that region of the log. Accordingly, each host may be unable to reallocate a region within its log if any reads that have been redirected to that region of the log are still outstanding, as indicated by the number of outstanding reads maintained by the coordinator.

In some embodiments, the coordinator may act to selectively delay reads or redirect reads. For example, the coordinator may initially operate to delay reads that target blocks of the storage volume currently being written. The coordinator may also track the percentage of reads that are delayed in this manner. If the percentage of reads that are delayed reaches a threshold value, the coordinator may begin redirecting reads that conflict with ongoing writes to the appropriate logs. In some embodiments, the coordinator may maintain information for each log indicating a general location of any current write activity to that log and a general structure of that log's layout. Using this information, the coordinator may selectively allow reads to be directed to the log if the execution of the read on the physical storage will not interfere with writes to the log (e.g., such interference would happen if the read targets a section of a log that is located on a disk that is currently not being accessed).

In some embodiments, hosts may not initiate reads prior to receiving a response from the coordinator. Instead, hosts may wait until a response indicating that the read can progress and indicating the correct location of the data (either in the storage volume or a log) before beginning to read the data.

In embodiments in which hosts may speculatively begin reading data from the storage volume prior to receiving a response from the coordinator indicating whether read access is proper, situations may arise in which the coordinator does not handle an overlapping read until completion of the write with which that read overlaps. However, the host performing the read may have speculatively read the old version of the data being written. In order to avoid erroneously returning an indication that the speculatively read data is correct (since no write is currently taking place to the targeted region of the storage volume at the time the coordinator handles the read), the coordinator may use event counters and write history.

Referring back at FIG. 1, event counters may be implemented by the virtualization layer 210 on each host 102 and by the coordinator 260. Each host 102 may initially set its event counter value to zero. Whenever a host 102 sends a request for permission to access a region of the storage volume 250 to the coordinator 260, the host 102 may include the current value of its event counter in the request message. The coordinator 260 may include the current value of its event counter in each response message sent to a host 102. In response to a message from the coordinator 260, a host 102 may update its event counter to the value provided by the coordinator 260 in the message. The coordinator 260 may update its event counter each time a new write request is received.

The coordinator 260 may also track write history by maintaining a record of recently handled write requests (e.g., the last 200 write requests) and the event counter values associated with those write requests. Each time a read request is received, the coordinator 260 may compare the event counter value included in the read request message with the event counter values recorded in the write history. If any of the event counter values in the write history indicate that one of the writes may overlap with the read, the coordinator 260 may send a response to the host 102 performing the read indicating that the speculatively read data should be discarded and a non-speculative read should be initiated (either to a log 240 or to the storage volume 250 subsequent to completion of the overlapping write to the storage volume). If the event counter value included in the read request message is not within the range of event counters currently maintained in the coordinator's write history, the coordinator may also send a response indicating that the read should be retried.

In an embodiment such as that shown in FIG. 3, each host may maintain physical location information for each block of data in the storage volume. In some embodiments, asynchronous block operations performed for a write access may change the physical location of certain blocks. Accordingly, if asynchronous block operations modify the location of any block, the host performing the asynchronous block operations may notify each other host of the new location of that block.

Referring back to FIG. 1, it is noted that in some embodiments, virtualization layer 210 and/or coordinator 260 may each combine multiple requests and/or responses into a single message on the communication network 106. For example, an instance of the virtualization layer 210 may be configured to wait for a short time between sending requests to the coordinator 260 or to wait for a short time after receiving a request from an application before sending a corresponding request to the coordinator 260. During such wait periods, the virtualization layer 210 instance may collect all read and/or write requests initiated on that host 102 into a single message (or at least fewer messages than the total number of read and/or write requests received during that period) for sending to the coordinator 260. The coordinator 260 may be configured to similarly collect multiple responses (to read and/or write requests) being sent to the virtualization layer 210 on a particular host into a single response message.

In some embodiments, the virtualization layer 210 and coordinator 260 may operate to implement read leases. An instance of the virtualization layer 210 executing on a host 102 may acquire a read lease from the coordinator 260 in the same manner as permission is acquired to perform a write. Read leases may each correspond to a region of storage in storage volume 250. A host 102 may acquire a read lease on a region in order to perform several reads to that region. If the coordinator 260 receives a request for permission to write a block within that region while the read lease is held, the coordinator 260 may send the host holding the read lease a message on the network 106 revoking the read lease prior to sending a response to the host requesting write permission. Accordingly, the write cannot be signaled as complete to the application that initiated the write until the read lease has been revoked. It is noted that several different hosts 102 may hold a read lease on the same region or on overlapping regions at the same time.

In another embodiment, a read lease may not block write permission to a block for which a read lease is currently held. In other words, the coordinator 260 may not require that the read lease on a block be revoked before write permission for that block is granted. However, the coordinator 260 may provide information identifying which hosts 102 currently hold a read lease on that block to the host performing the write, allowing the writing host to appropriately revoke the read leases and/or communicate with the hosts holding the read lease as necessary. For example, if performance of the asynchronous block operations related to the write modify the physical location of a block, the writing host may send each host identified by the coordinator 260 as holding the read lease on that block a message indicating the new physical location of the block.

Messages sent between the coordinator 160 and the hosts 102 may be used to propagate state information about the physical location of those blocks. For example, whenever coordinator 260 sends a response to a read request indicating that the read data is not currently locked from writing, the coordinator 260 may include information in that message indicating the current physical location of the read data. If the physical location of the read data indicated in the coordinator's response differs from mapping information used by that host to perform the read, the host may re-read the data from the correct location provided by the coordinator. Similarly, whenever the coordinator 260 revokes a read lease to a region of the storage volume 250, any host whose read lease is revoked may automatically invalidate local mappings indicating the physical location(s) of the block(s) within that region. In some embodiments, propagating state information in messages sent to and/or from the coordinator 260 may reduce the amount of message traffic on network 106. Messages to and/or from the coordinator 260 may also be used to transmit other state information, such as write sequence numbers indicating the ordering of writes, among the hosts 102.

In many embodiments, at least some reads and writes may target multiple blocks. Accordingly, locks such as write permissions and other access structures (e.g., read leases) managed by the coordinator 260 may also correspond to multiple blocks. For example, a host 102A may request write permission for a group of several blocks in a single request, and coordinator 260 may grant host 102A write permission to a region within the storage volume 250 that includes those blocks. While host 102A has write permission to that region, the coordinator may not allow any other host to gain write permission to blocks within that region.

It is noted that some embodiments may include multiple coordinators 260. For example, each coordinator 260 may be assigned a unique range of block addresses and be configured to coordinate the hosts' access to the block addresses assigned to that coordinator. In one such embodiment, if each coordinator 260 is configured to handle address ranges corresponding to regions of the storage volume 250 and there are three coordinators 260, addresses corresponding to regions 1, 4, 7, and so on may be assigned to the first coordinator, addresses corresponding to regions 2, 5, 8, and so on may be assigned to the second coordinator, and addresses corresponding to regions 3, 6, 9, and so on may be assigned to the third coordinator. In other embodiments, write requests may be assigned to coordinators 260 in other ways. For example, load-balanced assignment techniques may be used to route write requests to coordinators. Alternatively, write requests may be assigned to particular coordinators dependent on a hash of the first few bits of the address of the block(s) being written. Other techniques may also be used to assign write requests to coordinators. Providing more than one coordinator may decrease the load on each coordinator in some embodiments.

In some embodiments, the logs 240 may each be block-structured devices. If multiple write accesses to a log 240 are needed to log the write data for a particular write (i.e., if logging a single write requires several underlying accesses to log 240), during crash recovery it may be difficult for the virtualization layer 210 to determine whether the underlying accesses needed to log the write to the log completed prior to a system crash. The virtualization layer 210 may write additional data to the log in order to indicate whether the underlying accesses needed to log the write finished prior to a system crash. For example, the virtualization layer 210 may write a trailer for the write data to the log in a separate step performed after all blocks of write data have been written to the log. If a system crash occurs, the virtualization layer 210 may read the trailer to determine if all of the write data was written to the log prior to the system crash. Since the write would not have been signaled as being completed to the initiating application if the write to the log did not complete, the virtualization layer 210 may choose to not recover a write having an incomplete log entry.

In another embodiment, the virtualization layer 210 may attach a header to each sector of write data written to the log (assuming each sector is written to the log in a single operation). The header may include a sequence number corresponding to each sector of the write. The virtualization layer 210 may, in some embodiments, replace a small portion of the write data in each sector with this header information. The replaced portion of the write data from each sector may be written into another sector (e.g., a header block associated with the write data). This additional sector may be written concurrently with the other sectors of write data and header information. This additional sector may also include header information, such as a sequence number, and/or other metadata about the logged write. The sequence numbers may also be used to determine whether all of the write data was written to the log prior to the system crash.

Various embodiments may further include receiving, sending or storing instructions and/or data that implement the distributed virtualization layer and/or coordinator functionality in accordance with the foregoing description upon a computer accessible medium. Generally speaking, a computer accessible medium may include storage media or memory media such as magnetic or optical media, e.g., disk or CD-ROM, volatile or non-volatile media such as RAM, ROM, MEMS (Micro Electro-Mechanical Systems) memory, Flash memory, etc., as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
   a plurality of host computers coupled via a network, wherein the host computers are configured to communicate with a coordinator that coordinates write access to a storage volume, and wherein each host computer of the plurality of host computers stores a respective log;
   wherein a first host computer of the plurality of host computers is configured to:
      receive from a first application a write request to write data to the storage volume;
      in response to the write request, send a request to the coordinator for permission to write to the storage volume;
      in response to the write request, initiate logging of the data to a first log, wherein the logging is initiated prior to receiving the permission to write to the storage volume;
      receive a response from the coordinator indicating permission to write to the storage volume;
      receive from a second application a read request to read data from the storage volume;
      in response to the read request, request the coordinator to indicate whether a portion of the storage volume targeted by the read request is currently being written to; and
      read data from a second log stored by a second host computer of the plurality of host computers to satisfy the read request in response to receiving a reply from the coordinator indicating that the portion of the storage volume targeted by the read request is currently being written to.

2. The system of claim 1, wherein the first host computer is further configured to:
   provide a signal to the first application indicating completion of the write request after logging the data to the first log.

3. The system of claim 2, wherein the first host computer is further configured to:
   write the data to the storage volume after providing the signal to the first application.

4. The system of claim 1,
   wherein each host computer of the plurality of host computers stores a respective log;
   wherein the first log comprises the respective log stored by the first host computer.

5. The system of claim 1, wherein the first host computer is further configured to:
   receive from a second application a read request to read data from the storage volume;
   in response to the read request, request an indication from the coordinator that a portion of the storage volume targeted by the read request is not currently being written to.

6. The system of claim 5, wherein the first host computer is further configured to:
   initiate a read operation to read data from the portion of the storage volume targeted by the read request prior to receiving the indication from the coordinator.

7. The system of claim 6, wherein the first host computer is further configured to:
   provide a signal to the second application indicating completion of the read request after both completing the read operation and receiving the indication from the coordinator.

8. The system of claim 1,
   wherein the reply from the coordinator further indicates that the data for satisfying the read request is stored in the second log.

9. The system of claim 1,
wherein the request to the coordinator comprises a request for permission to write to a specified plurality of block addresses included in the storage volume;
wherein the first host computer is further configured to receive a response from the coordinator indicating permission to write to the specified plurality of block addresses included in the storage volume.

10. The system of claim 1,
wherein the coordinator includes a first coordinator that handles requests for access to a first range of block addresses within the storage volume and a second coordinator that handles requests for access to a second range of block addresses within the storage volume;
wherein the first and second range of addresses do not overlap.

11. A computer-readable memory medium comprising program instructions executable to implement a method comprising:
a first host computer of a plurality of host computers receiving from a first application a write request to write data to a storage volume, wherein each of the host computers is configured to communicate with a coordinator that coordinates write access to the storage volume, and wherein each host computer of the plurality of host computers stores a respective log;
in response to the write request, the first host computer sending a request to the coordinator for permission to write to the storage volume;
in response to the write request, the first host computer initiating logging of the data to a first log, wherein the logging is initiated prior to receiving the permission to write to the storage volume;
the first host computer receiving from a second application a read request to read data from the storage volume;
in response to the read request, the first host computer requesting the coordinator to indicate whether a portion of the storage volume targeted by the read request is currently being written to; and
the first host computer reading data from a second log stored by a second host computer of the plurality of host computers to satisfy the read request in response to receiving an indication from the coordinator that the portion of the storage volume targeted by the read request is currently being written to.

12. The computer-readable memory medium of claim 11, wherein the method implemented by the program instructions further comprises:
the first host computer receiving a response from the coordinator indicating permission to write to the storage volume; and
the first host computer providing a signal to the first application indicating completion of the write request after both logging the data to the first log and receiving the response from the coordinator.

13. The computer-readable memory medium of claim 12, wherein the method implemented by the program instructions further comprises:
the first host computer writing the data to the storage volume after providing the signal to the first application.

14. The computer-readable memory medium of claim 11,
wherein each host computer of the plurality of host computers stores a respective log;
wherein the first log comprises the respective log stored by the first host computer.

15. The computer-readable memory medium of claim 11, wherein the method implemented by the program instructions further comprises:
the first host computer receiving from a second application a read request to read data from the storage volume;
in response to the read request, the first host computer requesting an indication from the coordinator that a portion of the storage volume targeted by the read request is not currently being written to.

16. A method comprising:
a first host computer of a plurality of host computers receiving from a first application a write request to write data to a storage volume, wherein each of the host computers is configured to communicate with a coordinator that coordinates write access to the storage volume, and wherein each host computer of the plurality of host computers stores a respective log;
in response to the write request, the first host computer sending a request to the coordinator for permission to write to the storage volume;
in response to the write request, the first host computer initiating logging of the data to a first log, wherein the logging is initiated prior to receiving the permission to write to the storage volume;
receiving from a second application a read request to read data from the storage volume;
in response to the read request, requesting the coordinator to indicate whether a portion of the storage volume targeted by the read request is currently being written to; and
reading data from a second log stored by a second host computer of the plurality of host computers to satisfy the read request in response to receiving a reply from the coordinator indicating that the portion of the storage volume targeted by the read request is currently being written to.

17. The method of claim 16, further comprising:
the first host computer receiving a response from the coordinator indicating permission to write to the storage volume; and
the first host computer providing a signal to the first application indicating completion of the write request after both logging the data to the first log and receiving the response from the coordinator.

18. The method of claim 17, further comprising:
the first host computer writing the data to the storage volume after providing the signal to the first application.

19. The method of claim 16, further comprising:
the first host computer receiving from a second application a read request to read data from the storage volume;
in response to the read request, the first host computer requesting an indication from the coordinator that a portion of the storage volume targeted by the read request is not currently being written to.

20. A network system comprising:
a first computer system including a first storage volume;
a plurality of host computers coupled to the first computer system via a network, wherein said plurality of host computers includes a first host computer, and wherein each of said plurality of host computers stores an associated log;
a second computer system coupled to the first computer system and the plurality of host computers via the network, wherein the second computer system includes a coordinator configured to coordinate access by computers within said plurality of host computers to the first storage volume; and wherein, in response to an application executing on said first host computer initiating a write operation to said first storage volume, said first host computer is configured to:
- send a request to the coordinator for permission to write to said first storage volume; and
- prior to receiving said permission, initiate logging of write data associated with said write operation to one or more of the logs associated with the plurality of host computers.

21. The network system of claim 20, wherein said first host computer is configured to initiate logging of write data associated with said write operation to a first log associated with said first host computer.

22. The network system of claim 20, wherein said first host computer is configured to initiate logging of write data associated with said write operation to a second log associated with a second host computer included within said plurality of host computers.

23. The network system of claim 20, wherein said first host computer is further configured to:
- log the entire write data to the one or more of the plurality of logs;
- receive a response from the coordinator granting permission to write to said first storage volume; and
- after logging the entire write data and receiving the response from the coordinator, indicate completion of the write operation to the application that initiated the write operation.

* * * * *